(12) United States Patent
Muth (10) Patent No.: US 10,996,128 B2
(45) Date of Patent: May 4, 2021

(54) METHOD FOR INSTALLING A COUNTERWEIGHT ON A SHAFT, AND A DEVICE FOR THIS PURPOSE

(71) Applicant: Schenck RoTec GmbH, Darmstadt (DE)

(72) Inventor: Christian Muth, Fischbachtal (DE)

(73) Assignee: Schenck RoTec GmbH, Darmstadt (DE)

( * ) Notice: Subject to any disclaimer, the term of this patent is extended or adjusted under 35 U.S.C. 154(b) by 165 days.

(21) Appl. No.: 15/572,254

(22) PCT Filed: May 20, 2016

(86) PCT No.: PCT/EP2016/061456
§ 371 (c)(1),
(2) Date: Nov. 7, 2017

(87) PCT Pub. No.: WO2016/188913
PCT Pub. Date: Dec. 1, 2016

(65) Prior Publication Data
US 2018/0128703 A1      May 10, 2018

(30) Foreign Application Priority Data

May 22, 2015   (DE) ..................... 10 2015 108 187.3

(51) Int. Cl.
*G01M 1/02*   (2006.01)
*G01M 1/24*   (2006.01)
*G01M 1/32*   (2006.01)

(52) U.S. Cl.
CPC ................ *G01M 1/02* (2013.01); *G01M 1/24* (2013.01); *G01M 1/32* (2013.01)

(58) Field of Classification Search
CPC ............ G01M 1/02; G01M 1/24; G01M 1/32; G01M 1/16; G01M 1/30
See application file for complete search history.

(56) References Cited

U.S. PATENT DOCUMENTS

| 3,554,061 A | 1/1971 | Holdinghausen |
| 3,811,327 A | 5/1974 | Hack |
| (Continued) | | |

FOREIGN PATENT DOCUMENTS

| DE | 2 217 264 C2 | 5/1974 |
| DE | 43 36 509 A1 | 3/1995 |
| (Continued) | | |

OTHER PUBLICATIONS

International Search Report of PCT/EP2016/061456, dated Aug. 23, 2016.

(Continued)

*Primary Examiner* — Christopher J Besler
*Assistant Examiner* — Christine Bersabal
(74) *Attorney, Agent, or Firm* — Collard & Roe, P.C.

(57) ABSTRACT

A balancing device for installing a counterweight in a specified shaft balancing region paired with a balancing plane includes a securing device which can be controlled via a control unit. The securing device has a first and a second receiving area for a counterweight or the shaft at a free end. A slot is arranged on the balancing device such that the balancing device can be moved along the shaft in the axial direction. The balancing device has a sensor for ascertaining the position of the balancing device relative to the shaft. The balancing device further includes a display unit which is connected to the control unit so as to exchange data and which is designed such that the position of the balancing device relative to the balancing region can be displayed.

7 Claims, 3 Drawing Sheets

(56) References Cited

U.S. PATENT DOCUMENTS

| | | | |
|---|---|---|---|
| 5,526,686 A | 6/1996 | Fuchs et al. | |
| 7,249,508 B2 * | 7/2007 | Rogalla | G01M 1/32 |
| | | | 73/468 |
| 8,113,049 B2 * | 2/2012 | Corghi | G01B 11/2522 |
| | | | 353/13 |

FOREIGN PATENT DOCUMENTS

| | | |
|---|---|---|
| DE | 199 41 597 A1 | 3/2001 |
| DE | 102 30 207 A1 | 1/2004 |
| EP | 1 520 161 B1 | 9/2007 |
| JP | S57-137080 A | 8/1982 |
| JP | 2005-169507 A | 6/2005 |
| WO | 2004/005878 A1 | 1/2004 |

OTHER PUBLICATIONS

International Search Report of PCT/EP2016/061455, dated Aug. 22, 2016.

* cited by examiner

METHOD FOR INSTALLING A COUNTERWEIGHT ON A SHAFT, AND A DEVICE FOR THIS PURPOSE

CROSS REFERENCE TO RELATED APPLICATIONS

This application is the National Stage of PCT/EP2016/061456 filed on May 20, 2016, which claims priority under 35 U.S.C. § 119 of German Application No. 10 2015 108 187.3 filed on May 22, 2015, the disclosure of which is incorporated by reference. The international application under PCT article 21(2) was not published in English.

The invention relates to a method for attaching counterweights to a shaft, comprising at least one balancing device that is movable longitudinally to the shaft that is arranged in a device for measuring imbalance, and a fastening device for fastening the counterweights to the shaft. The invention further relates to a balancing device for attaching a counterweight in a specified balancing region of a shaft, which region is associated with a balancing plane, comprising a fastening device that can be controlled by a control unit and a free end of which comprises a first and a second receptacle for a counterweight or the shaft, and comprising a carriage that is arranged on the balancing device such that the balancing device can be moved along the shaft in the axial direction.

Balancing machines of the type mentioned at the outset are used for balancing rotors, such as jointed shafts or cardan shafts. In order to be able to determine the imbalance on the rotor, the rotor is inserted into the balancing machine and rotated. If the rotor has an imbalance, effects of this imbalance are recorded by corresponding sensors and processed such that the imbalance can be compensated in a known manner, for example by a counterweight being attached to the rotor by means of welding or adhesive bonding. Generally, the imbalance is measured again following the compensation in order to test the compensation. Further compensation can take place if necessary.

The magnitude and size of the imbalance measured, and the balancing mass and balancing angular position calculated therefrom are shown on a display system that is rigidly mounted on the balancing machine. Display systems of this kind are known, inter alia, from DE 2 217 264. Moreover, further information regarding the measurement, for example the balancing speed, can be displayed via the display system. The imbalance is compensated using an automatically or manually operable balancing device, by a counterweight being attached, by means of a fastening device, to the rotor at a position that is dependent on the rotor type in question. The balancing mass has a balancing position relative to the rotor that is defined in particular by the radial, axial and angular position, the radial and axial position for attaching the counterweight being dependent on the rotor type, and thus predetermined. In contrast, the balancing mass and/or the angular position result from measuring the imbalance.

In the case of manual imbalance compensation, a user can move the balancing device axially with respect to the rotor and into the specified position. The user obtains the information necessary therefor from the display system, on which the position or, optionally, further positions, for attaching counterweights are displayed. In order not to adversely influence properties of the rotor by attaching the counterweight, the mobility of the balancing device is restricted to specified balancing regions by means of end stops that can be positioned manually, and therefore the counterweights can be attached only in these regions. Furthermore, in the case of a plurality of balancing positions, the sequence for attaching the counterweights is specified to the user of the balancing device. The rotor can be automatically or manually rotated into a position in which the calculated angular position is easily accessible. After the user has brought the balancing device into position, said user fits the fastening device with the counterweight and initiates the fastening process. Said user acquires information, via the display system, regarding whether further balancing is required, and therefore said user can, if necessary, move the balancing device to the next axial position.

A disadvantage of the known balancing machines is that, during operation of the balancing device, the user does not acquire any information regarding the compensation and/or regarding the next balancing position to be approached, and therefore said user must briefly interrupt the process in order to acquire further information from the display system regarding the balancing process. The interruption not only delays the balancing process, but can also cause errors that may result in the counterweight not being fastened in the specified region, which may in turn adversely influence the rotational behaviour of the rotor. Moreover, the sequence of positions to be approached is specified to the user, but without the relevant position of the balancing device being taken into account.

The object of the invention is that of improving the operability of a balancing device, such that fastening errors during attachment of the counterweights can be minimised.

The object is achieved according to the invention in that a method for attaching counterweights to a shaft is provided, comprising at least one balancing device that is movable longitudinally to the shaft that is arranged in a device for measuring imbalance, and a fastening device for fastening the counterweights to the shaft. The method comprises the following steps:

a. receiving the shaft in bearing means of the device for measuring imbalance, which bearing means is arranged on a machine bed, such that said shaft is rotatable about an axis of rotation;

b. rotating the shaft about the axis of rotation, determining the imbalance of the shaft, and calculating, by means of an evaluation unit, balancing masses and angular positions for at least two balancing planes associated with a specified balancing region in each case;

c. displaying a position of at least one balancing device relative to the balancing planes associated with the balancing regions on a display unit that is connected, for data exchange, to a control unit, a sensor that is fixed to the balancing device detecting position data and routing the position data to the control unit which determines the position of the balancing device relative to the balancing regions;

d. moving the balancing device into one of the displayed balancing regions, and displaying, on the display unit, the balancing region approached by the balancing device and the balancing mass associated with said region;

e. fitting the fastening device with a counterweight corresponding to the displayed balancing mass; and f. initiating the process for fastening the counterweight to the shaft.

The imbalance of the shaft is measured and is evaluated by an evaluation unit. The evaluation unit calculates the balancing masses and the angular positions for at least two balancing planes, associated with a balancing region in each case, for attaching the counterweights. In general, the balancing regions are specific to the rotor type and are therefore predetermined. A user can attach the counterweights using the balancing device. An advantage of the method according to the invention is that the position of at least one balancing device relative to the balancing planes associated with the balancing regions is displayed to a user on a display unit connected, for data exchange, to a control unit, before said user moves the balancing device and carries out the compensation. A sensor fixed to the balancing device detects position data and routes the position data to the control unit which determines the position of the balancing device relative to the balancing regions. The display unit can be arranged on the evaluation unit and/or the balancing device as a screen for example. Another location for the display unit on the device for measuring imbalance may also be advantageous. On account of the position of the balancing device relative to the balancing regions being determined and being displayed on the display unit, the user can decide, on the basis of the current location of the balancing device, which of the displayed balancing regions to approach first. This makes the work more ergonomic, since the user does not need to move the balancing device unnecessarily and can independently decide the sequence for attaching the counterweights, meaning that the compensation requires less time. Moreover, it is no longer necessary to manually mark the balancing regions, since the mobility of the balancing device is limited by positioned end stops. Advantageously, the control unit determines the position of the balancing device relative to the shaft received in the bearing means and the determined position is displayed on the display unit. This may be advantageous in particular in the case of long shafts, where the balancing regions are at opposite ends of the shaft. The user is thus informed of the remaining distance to the next balancing region. This is advantageous in particular when a plurality of balancing devices is available to the user. Since the positions of the balancing devices and the position thereof relative to the balancing regions are shown on the display unit, the user can decide which balancing device is closest to a selected balancing region.

After the balancing regions have been displayed and one balancing region has been selected, the balancing device is moved into said region, the balancing region approached by the balancing device and the balancing mass associated with said region being displayed on the display unit. It is advantageous, in this regard, for the display unit to be arranged on the balancing device or at least in the vicinity thereof, so that the user can view the display unit during movement of the balancing device. As soon as the balancing device is in the selected balancing region, the fastening device is fitted with a counterweight that corresponds to the displayed balancing mass, and the process for fastening the counterweight to the shaft can be initiated. It may be advantageous for the shaft to be rotated, in step d., into the calculated angular position for attaching the counterweight. The sensor in particular continuously determines the position of the balancing device, and therefore the control unit can calculate, on the basis of the position data transmitted by the sensor and the balancing regions specified by the evaluation unit, when the balancing device is positioned in the selected balancing region. The control unit can then rotate the shaft into the calculated angular position for attaching the counterweight. However, the user can also manually rotate the shaft into the calculated angular position, or said rotation can take place during another step of the method. It may furthermore be advantageous for a movement direction to be detected during movement of the balancing device, and for the shaft to be rotated, by means of the control unit, into the angular position that is determined for attaching a counterweight in the balancing region that is in the movement direction and is adjacent to the balancing device.

It is no longer necessary for the user to consult the display unit attached to the device for measuring imbalance during movement of the balancing device, and therefore a continuous process is ensured that can proceed without significant interruptions. The accuracy of the positioning of the counterweights can thereby be improved. A further advantage is that the time required for moving the balancing device and for attaching the counterweight is reduced, since the user can acquire all necessary information from the display unit.

If further counterweights are to be attached to the shaft, steps d. to f. can be repeated in further balancing regions or balancing planes in order to attach further counterweights, it being possible to select the sequence for attaching the counterweights. After the imbalance has been determined, the display unit shows the balancing masses to be attached in the balancing regions in order to compensate the imbalance. The sequence for attaching the counterweights can be freely selected.

In order to ensure that the counterweight is attached in the balancing region specified by the evaluation unit, it may be provided for the counterweight to be fastened to the shaft only when the balancing device is positioned within the balancing region specified by the evaluation unit. Incorrect fastening of the counterweights can thus be prevented.

In one embodiment, the sensor fixed to the balancing device detects position data arranged on the device for measuring imbalance, in particular on the machine bed. The position data can be in the form of a scale that is detected by the sensor. The sensor can in particular be a laser sensor that is fastened to the main body of the balancing device. Advantageously, the sensor is arranged in the same plane as the fastening device.

Fastening of the counterweight and movement of the balancing device are initiated by switches on a controller arranged on the balancing device, in particular a handle fitting. A controller can be fastened to the balancing device, which controller is designed, for example, as a handle fitting. Switches can be arranged on the controller, which switches cause automatic movement of the balancing device when actuated. It is also possible, however, for the balancing device to be moved manually using the controller.

In a further aspect, the invention relates to a balancing device for attaching a counterweight in a specified balancing region of a shaft, which region is associated with a balancing plane, comprising a fastening device that can be controlled by a control unit and a free end of which comprises a first and a second receptacle for a counterweight or the shaft, and a carriage that is arranged on the balancing device such that the balancing device can be moved along the shaft in the axial direction, the balancing device comprising a sensor for determining the position of the balancing device relative to the shaft, and in that the balancing device comprises a display unit that is connected, for data exchange, to the control unit and is designed such that the position of the balancing device relative to the balancing region can be displayed. The balancing device can be designed as a mobile unit that is manually operated by a user. The position of the balancing device is determined by the sensor and is shown on the display unit after being processed by the control unit. The user can view the display unit during movement and compensation without needing to interrupt the operation of the balancing device. This not only improves the working conditions for the user of the balancing device, but also the accuracy of the fastening of the counterweights.

The display unit in particular comprises means for wireless or wired data exchange with the control unit. Entries that the user makes via the display unit are thus transmitted to the control unit, and data from the control unit is sent to the display unit. The means may be hardware interfaces that allow a radio link or a wired connection to be established. The position data detected by the sensor are routed wirelessly or in a wired manner to the control unit, and the control unit calculates the position of the balancing device therefrom, using corresponding software. In order to additionally determine the position of the balancing device relative to the shaft and/or to the balancing regions, the control unit advantageously comprises means for wireless or wired data exchange with an evaluation unit arranged on the balancing machine. As a result, information regarding the balancing mass required for compensating the imbalance, and/or information regarding the counterweight, can also be sent to the control unit and, optionally, from said unit to the display unit. The control unit calculates the position of the balancing device relative to the shaft and/or relative to the balancing planes associated with the specified balancing regions by using the data obtained. The positions are then sent to the display unit which shows said data accordingly. Wireless transmission of the data from the evaluation unit to the control unit and from the control unit to the display unit is advantageous since this results in only minor or no restrictions when moving the balancing device.

According to the invention, the display unit is arranged on the balancing device, in particular on the main body of the balancing device. Within the meaning of the invention, the display unit can also be referred to as a user interface of the control unit. The display unit can be designed as a screen that can be operated by means of operator controls. The operator controls can be arranged around the screen. The display unit can, however, also be designed as a touch-sensitive screen or a touchscreen, and therefore operator controls are no longer needed. It may furthermore be advantageous for a receptacle for the display unit to be provided on the balancing device, from which receptacle the display unit can be removed and into which the display unit can be inserted. It is advantageous, in this regard, for the display unit to be designed as a mobile computer unit, in particular as a tablet computer. The operator can remove the display unit from the receptacle and move away from the balancing device, and continue to make entries on the display unit or call up information via said unit.

Furthermore, the receptacles can be brought into an open or closed position resting on the shaft, by means of a controller that is arranged on the fastening device and is connected to the control unit. The balancing device can also be manually moved using the controller. In addition, switches can be arranged on the controller, by means of which switches the process of fastening the counterweight can be initiated. Furthermore, the controller is designed as a handle fitting comprising switches. The user can control substantially all of the actions of the balancing device using the switches, and can thus also use said switches to initiate fastening of the counterweight by the fastening means or to control the movement of the balancing device.

The balancing device is moved on a guide rail that extends longitudinally with respect to the shaft that is arranged in a device for measuring imbalance. The balancing device in particular comprises a carriage that is attached to a main body of the balancing device. It is also possible for the balancing device to be moved in a manner assisted by a motor. This can significantly simplify the movement of the balancing device. The balancing device can be designed such that the counterweight can be attached to the shaft by adhesive bonding or by welding. The receptacles for the fastening device are then designed accordingly. Advantageously, an existing balancing device can also be retrofitted with a display unit, a control unit connected thereto, and a sensor for determining the position of the balancing device.

The invention will be described in more detail in the following, with reference to embodiments of the invention that are shown in the drawings. In the drawings.

Figure 1:
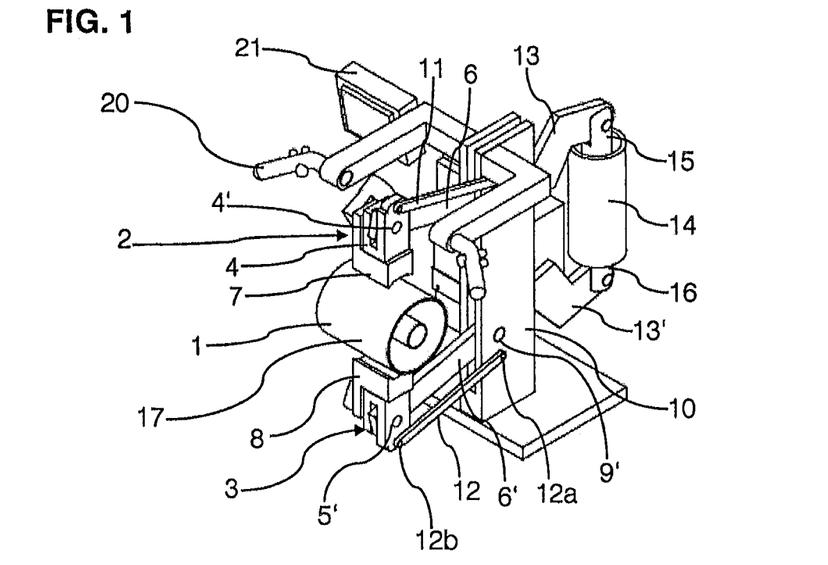
FIG. 1 is a perspective view of a preferred balancing device having open pincer units.
Figure 2:
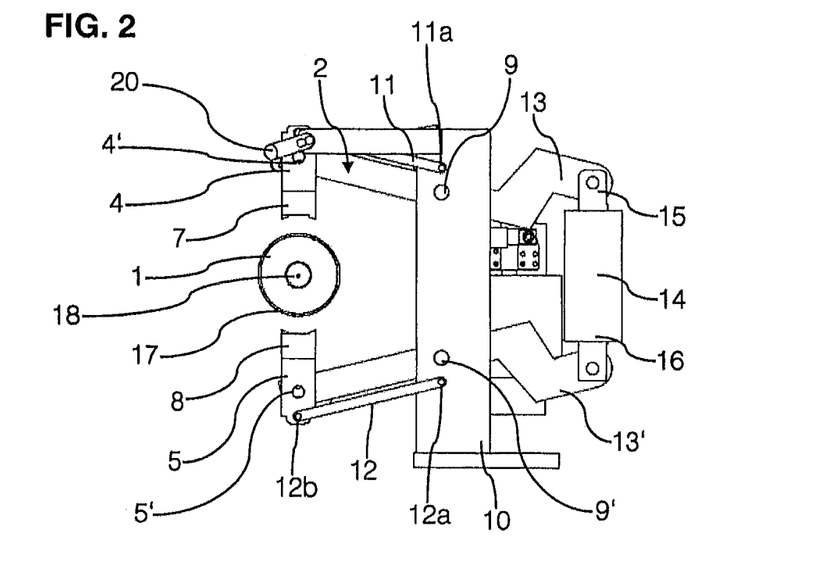
FIG. 2 is a side view of FIG. 1.
Figure 3:
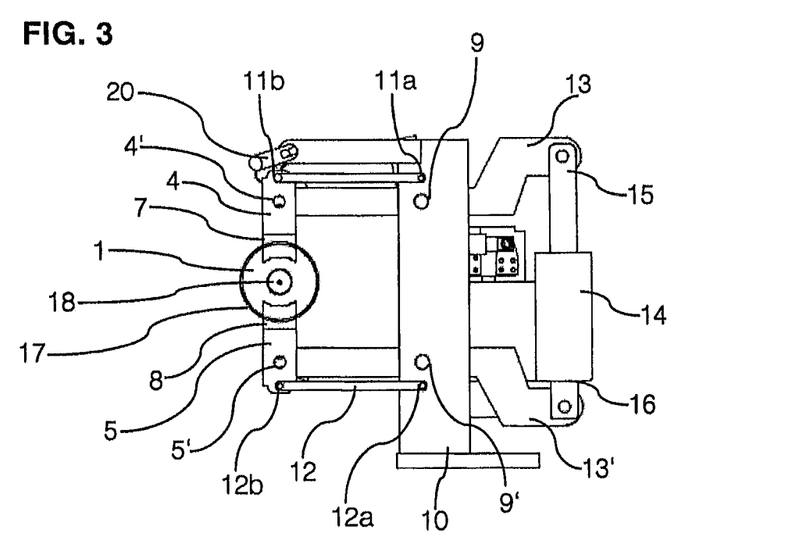
FIG. 3 is a side view of a preferred balancing device having closed pincer units.

The device shown in FIGS. 1 to 3 for attaching a counterweight to a shaft 1 comprises a fastening device comprising pincer units 2, 3. An upper pincer unit 2 comprises an upper receiving part 4 and a lower pincer unit 3 comprises a lower receiving part 5. The fastening device is shown by way of example in the figures as a pincer-like assembly comprising pincer units 2, 3, although the invention also comprises other embodiments of the fastening device. The receiving parts 4, 5 are arranged on the first lever ends 6, 6' of the pincer units 2, 3. An upper receiving part 4 comprises an upper receptacle 7 and a lower receiving part 5 comprises a lower receptacle 8, one receptacle 7, 8 being provided in each case for receiving the counterweight or the shaft 1. The receiving parts 4, 5 can also be designed such that a plurality of receptacles for counterweights can be fastened, although the figures in each case show, by way of example, a receiving part 4, 5 comprising just one receptacle 7, 8. The receiving parts 4, 5 can be rotatably mounted on the lever arms, the upper receiving part 4 being rotatably mounted on the upper pincer unit 2 by means of a bearing point 4', and the lower receiving part 5 being rotatably mounted on the lower pincer unit 3 by means of a bearing point 5'. The bearing points 4', 5' of the receiving parts 4, 5 on the lever arms could be formed, for example, as pin-like connection means, bolts or a corresponding bearing arrangement. Within the meaning of the invention, in particular the means for the rotatable mounting are considered to be bearing points 4', 5'.

In the embodiment of the balancing device shown by way of example in the drawings, the pincer units 2, 3 are designed as two-armed levers that are each mounted on a main body 10 so as to be rotatable about a fulcrum 9, 9'. The pincer units 2, 3 can be mounted on the main body 10 using known bearing means, such as bolts. Within the meaning of the invention, the fulcrums 9, 9' in particular denote the means for the rotatable mounting. Furthermore, two guide rods 11, 12 are fastened to the main body 10. In this case, the first end of the first guide rod 11 is rotatably mounted on the main body 10 by means of an articulation point 11*a*, and the second end of said guide rod is rotatably mounted on the receiving part 4 of the upper pincer unit 2 by means of an articulation point 11*b*. The first end of the second guide rod 12 is rotatably mounted on the main body 10 by means of an articulation point 12*a*, and the second end of said guide rod is rotatably mounted on the receiving part 5 of the lower pincer unit 3 by means of an articulation point 12*b*. Within the meaning of the invention, in particular the means for the rotatable mounting are considered to be articulation points 11a, 12a, 11b, 12b.

At the second lever ends 13, 13' opposite the first lever ends 6, 6' of the pincer units 2, 3, the pincer units 2, 3, designed as levers, are interconnected by means of a lifting cylinder 14. The second lever end 13, 13' of each pincer unit 2, 3 can be angled with respect to the first lever end 6, 6' in order, for example, to allow lifting cylinders of various sizes to be fastened to the pincer units 2, 3. In this case, the upper pincer unit 2 is rotatably fastened to the piston 15 of the lifting cylinder 14, and the lower pincer unit 3 is rotatably fastened to the cylinder 16 of the lifting cylinder 14. The lifting cylinder 14 can be designed as a pneumatic cylinder or a hydraulic cylinder. Application of pressure to the lifting cylinder 14 causes the second lever ends 13, 13' of the pincer units 2, 3 to be pressed apart from one another, and therefore the spacing of the receptacles 7, 8 reduces until, finally, the receptacles 7, 8 come into contact, together, with the surface 17 of the shaft 1. The receptacles 7, 8 of the pincer units 2, 3 can, however, also be brought into contact with the shaft 1 by means of an electromotive feed unit, such that the lever ends 13, 13' are accordingly connected to such a unit. Weight compensation, which may be necessary, can be achieved by means of a pneumatic cylinder connected to the pincer-like assembly.

Counterweights can be fastened to the shaft 1 by adhesive bonding or welding. The shape of the receptacles 7, 8 for the counterweights or the shaft 1 is adapted to the shaft circumference and is concavely curved. The shape of the counterweights is also generally concavely curved. The pincer units 2, 3 can be moved into open end stop positions that lie in the same plane as the axis of rotation 18, as shown in FIGS. 1 and 2. The device can be designed for various shaft diameters. In the figures, a segment of a shaft having a smaller and a larger shaft diameter is shown by way of example.

In order to determine an imbalance of a shaft 1 and to compensate the imbalance, a shaft 1 to be balanced is mounted in bearing means on a machine bed of a device of the shaft balancing machine for measuring imbalance, so as to be rotatable about the axis of rotation 18, and is rotated about the axis of rotation 18 by means of a drive. Sensors, such as distance sensors, detect the rotational behaviour of the shaft 1 and forward measured data to an evaluation unit which then calculates an imbalance that may be present and, accordingly, balancing masses and angular positions for at least two balancing planes that are associated with a specified balancing region in each case. The balancing region denotes a region of the shaft that is specified by a manufacturer, is dependent on the rotor type and comprises the balancing plane together with corresponding tolerances for attaching the counterweight. The balancing plane in particular also comprises the balancing location. The imbalance is compensated, i.e. the counterweight is attached in the balancing plane, using the device according to the invention. The device can be integrated in the balancing machine as a separate unit and can be designed so as to be manually operable.

Figure 4:
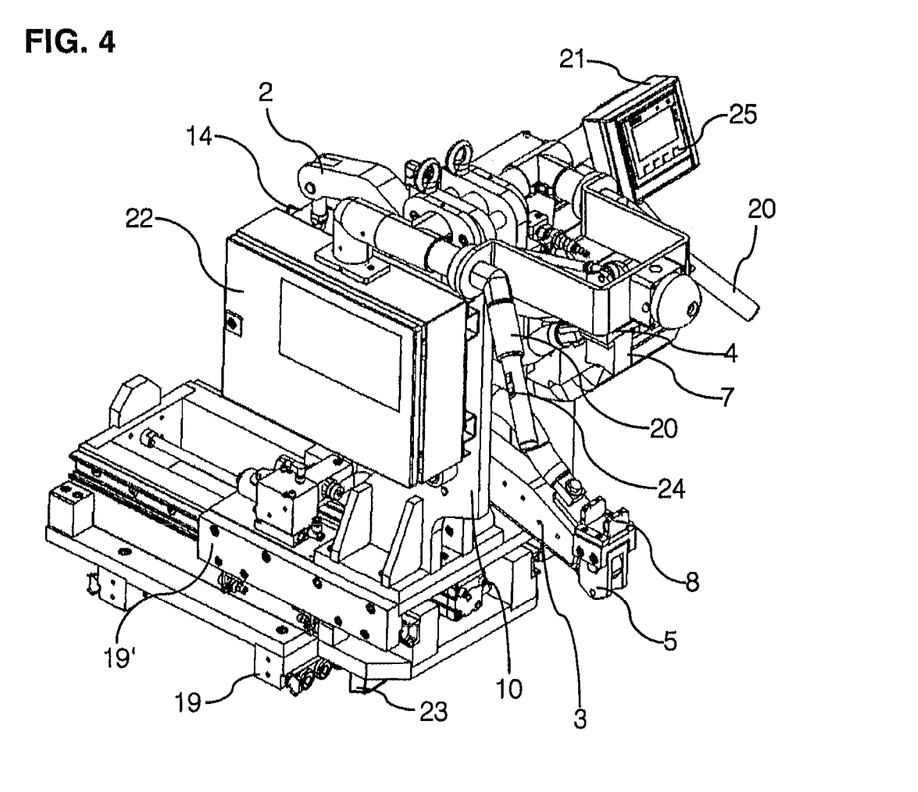
FIG. 4 is a schematic view of a preferred balancing device for attaching counterweights.

In order to be able to move the device into the relevant balancing region, the device is mounted on a first movable guide carriage 19, as shown in FIG. 4, such that the device is movable in the longitudinal direction of the shaft. The guide carriage 19 can be movably mounted on a guide rail that extends longitudinally with respect to the axis of rotation 18. The guide carriage 19 is attached to the main body 10 of the device. Furthermore, the device can be moved transversely to the axis of rotation 18 in order to allow the shaft 1 to be inserted into the bearing means and to be removed therefrom. For this purpose, the device comprises a further guide carriage 19' that is arranged transversely to the first guide carriage 19.

The device is provided with a controller that is designed as a handle fitting 20 and is used for manually positioning the device and for operating the device. A user moves the device to the balancing region using the handle fitting 20, it being possible for the positioning to be air-assisted or motor-assisted in order to facilitate movement of the device.

A display unit 21 is arranged on the device, which unit is connected, for data exchange, to a control unit 22 by means of which it is possible to control the balancing device using the handle fitting 20. It is possible, however, for a further display unit 21 to be attached to or in the vicinity of the evaluation unit. Furthermore, the display unit 21 can also be arranged at a different position of the balancing machine. After the imbalance has been measured; the position of at least one balancing device relative to the balancing planes associated with the balancing regions is displayed on the display unit 21 that is connected, for data exchange, to the control unit 22. The control unit 22 is connected, for data exchange, to the evaluation unit arranged on the balancing machine, and comprises means for wireless or wired communication. This may, for example, be a WLAN interface, another radio interface, or a wired interface. A sensor 23 fixed to the balancing device detects position data and routes the position data to the control unit 22 which determines the position of the balancing device relative to the balancing regions. A user can thus already identify, on a display unit 21, for example a display unit 21 associated with the evaluation unit, the position of at least one balancing device relative to the balancing planes associated with the balancing regions, before the balancing device has actually moved. This is advantageous in particular if a plurality of balancing regions is provided on the shaft 1 and, optionally, a plurality of balancing devices is arranged along the shaft. The user can, for example, select the balancing region that is closest to a balancing device and carry out a first compensation operation. The user can also freely select the sequence of the balancing regions to be approached.

Subsequently, the balancing device is moved into the first selected balancing region, the balancing region approached by the balancing device and the balancing mass associated with said region being displayed on the display unit 21. The balancing mass specified by the evaluation unit for compensating the imbalance, and/or information regarding the necessary counterweight to be applied to the shaft 1, are transmitted from the evaluation unit to the control unit 22 and also displayed as information on the display unit 21. A user can thus directly read, on the display unit 21, which counterweight is required for the balancing region approached, and the counterweight with which one of the receptacles 7, 8 is to be fitted. The display unit 21 is an electrically actuated display for optically indicating variable information such as images or characters. The display unit 21 is connected, for data exchange, to the control unit 22 and comprises hardware interfaces required for this purpose, which interfaces allow wireless or wired communication with the control unit 22. The display unit 21 can also be designed as a touch-sensitive screen. The display unit 21 can be designed as an independent computer unit comprising a microprocessor. It is also possible, however, for the display unit 21 to be provided as a user interface of the control unit 22 and to therefore pictorially display only the data or information provided by the control unit 22.

The sensor 23 fixed to the balancing device detects position data displayed on the device for measuring imbalance, and forwards the position data to the control unit 22 that is arranged on the balancing device, for example. The control unit 22 processes the obtained position data using corresponding software. The calculated position of the balancing device relative to the balancing planes associated with the balancing regions, and optionally the position of the balancing device relative to the shaft 1 received in the bearing means of the device for measuring imbalance, are displayed on the display unit 21. The position data detected by the sensor 23 may be marker points that are arranged on the machine bed as a scale. The sensor 23 is designed as a laser sensor and is fastened to the main body 10 in the same plane as the receptacles 7, 8. It is also possible for a plurality of sensors 23 to be attached to the balancing device. In addition to the sensor 23, a pointer arranged on the balancing device can mark the position of the balancing device on the scale, it being easy for the user to read off the position.

The sensor 23 can be scaled in that the signal of the sensor 23 increases as the balancing device moves in a direction away from a selected zero point which may, for example, be on one of the bearing means, and decreases towards the zero point. As a result, a change in direction of the balancing device can be determined. The information regarding the shaft 1 affected by imbalance that is necessary for calculating the position, for example the type designation, length and diameter of the shaft 1, the length and position of the balancing regions, and the position of the balancing planes, is transmitted to the control unit 22 from the evaluation unit. It may also be advantageous, however, for the necessary information to be input via the control unit 22. Corresponding software on the control unit 22 processes the information and calculates, from the determined position data of the sensor 23, the position of the balancing device relative to the shaft 1 and to the balancing planes and/or the balancing regions.

The balancing device can be moved or electromotively moved using the switch 24 attached to the handle fitting 20, since the controller designed as a handle fitting 20 is connected, for data exchange, to the control unit 22 for controlling the balancing device. The welding process for attaching the counterweight can also be started by means of the switch 24 of the handle fitting 20.

The display of the display unit 21 is automatically enlarged as soon as the user moves the display device into the specified and selected balancing region, so that the user can also easily read the information shown on the display unit 21 from a greater distance. In addition, the user can thus rapidly identify that the balancing device is in the balancing region. The user can operate the display unit 21 by means of operator controls 25 arranged on the display unit 21, and can select the information to be shown on the display using a menu, for example.

Since the sensor 23 in particular continuously determines the position of the balancing device, the control unit 22 can calculate when the balancing device is in the selected balancing region. As a result, the shaft 1 can be automatically rotated into the angular position, calculated by the evaluation unit, for attaching the counterweight, when the balancing device is positioned in the selected balancing region. It is possible, however, for the shaft 1 to be rotated in automatically, or manually by the user, before or during another method step. Furthermore, the shaft 1 can also be rotated in on the basis of the direction of movement of the balancing device, such that the shaft 1 is automatically rotated into the relevant angular position when the balancing device moves from a starting point towards the selected balancing region. In this case, the control unit 22 rotates the shaft 1 into the angular position that is determined for attaching a counterweight in the balancing region that is in the movement direction and is adjacent to the balancing device. The display unit 21 can also display the balancing mass associated with a balancing region, as soon as the balancing device moves into the corresponding and selected balancing region.

As soon as the balancing device is positioned and is locked in the balancing plane associated with a balancing region, the user can fit the fastening device with a counterweight that corresponds to the displayed balancing mass, and can insert a counter weight into the lower recess 8 or optionally onto the shaft 1. The welding process can be initiated by the switch 24 on the handle fitting 20.

The welding process can only be started, however, when the balancing device is positioned within the balancing regions specified by the evaluation unit. It may also be advantageous for additional further, previously defined conditions to be fulfilled. The conditions are verified by the control unit, in data exchange with the evaluation unit, and accordingly shown on the display unit 21. The display unit 21 on the balancing device then indicates to the user whether the control unit 22 has enabled fastening of the counterweight. The conditions that may be necessary for enabling fastening include the correct clamping of the shaft 1, rotation of the shaft 1 into the angular position, and/or positioning of the balancing device within the specified balancing region. Furthermore, the functionality of the balancing device, in particular the welding device, is checked. If fastening has been enabled by the control unit 22, the user can initiate the welding process. The display unit 21 can, moreover, comprise visual and acoustic means in order to transmit optical and acoustic signals to the user. For example, enablement can be indicated to the user by a green flashing light and a corresponding acoustic signal, and the occurrence of an error message can be indicated by a red flashing light.

Actuation of the switch 24 causes the pincer units 2, 3 to close pneumatically and to become welded. The counterweight in the lower receptacle 8 is pressed against the surface 17 of the shaft and fastened by means of a welding process, the lower and upper receptacles 7, 8 acting as electrodes. Successful welding is shown on the display unit 21. If the fastening cannot be carried out, or cannot be carried out completely, an error message can be displayed to the user via the display unit 21. Following successful welding, the pincer units 2, 3 open. Subsequently, the user can release the device and, if necessary, move said device to the next balancing region shown on the display unit 21 by actuating the switch 24, the user being able to freely select the sequence for attaching the counterweights. If all the necessary counterweights are attached to the shaft 1, a test measuring cycle is carried out in order to test the compensation of the imbalance. If necessary, further counterweights can then be attached to the shaft 1 using the device. Otherwise, the device can be moved, using the guide carriage 19', in order to remove the shaft 1 and insert another shaft affected by imbalance into the balancing machine.

Of course, other known fastening means, such as adhesive means, can also be used instead of or in addition to the welding means shown and described. The scope of the invention further includes spatially separating the device for fastening counterweights from the balancing machine if this should prove to be favourable, for example for a production line. The shaft is then transferred from the balancing machine into the device, information regarding the determined imbalance and/or compensation data resulting therefrom being forwarded.

Figure 5:
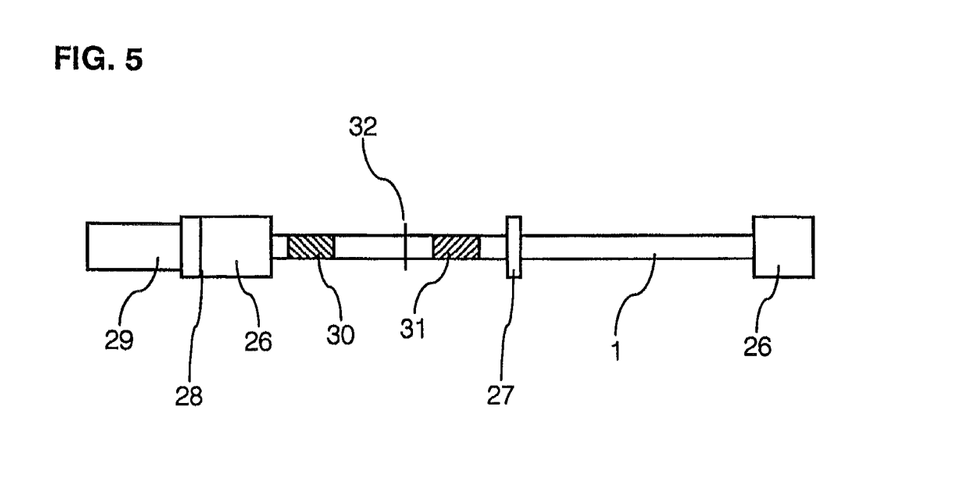
FIG. 5 is a schematic view of a shaft comprising balancing regions, shown on a display unit.
Figure 6:
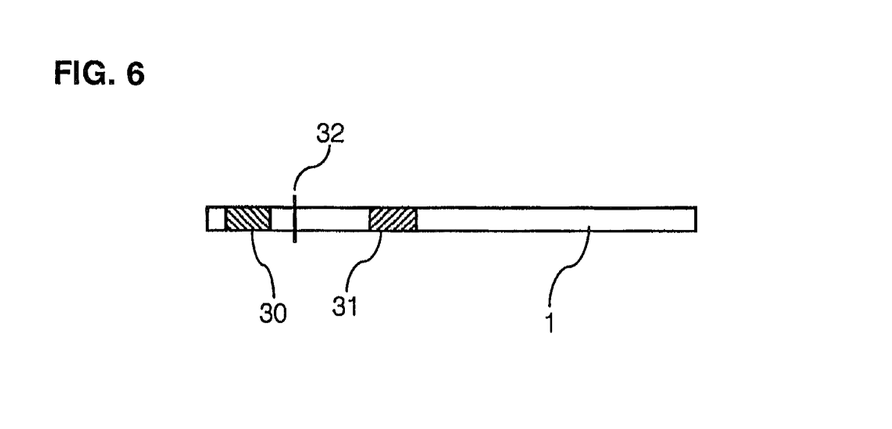
FIG. 6 is a further schematic view of a shaft comprising balancing regions, shown on a display unit.

FIG. 5 is a schematic view of a shaft comprising balancing regions, shown on a display unit. After the imbalance of the shaft 1 has been measured, the shaft 1 is shown schematically on the display unit, it being possible for the display unit to be arranged on the balancing machine itself and/or on or in the vicinity of the balancing device. The depiction includes, in addition to the shaft 1 mounted in a bearing means 26, a Genre center bearing 27, and a drive 29 that is connected to the shaft 1 by means of a flange 28. A first balancing region 30 is located at a spacing from the flange 28 that is dependent on the rotor type. A second balancing region 31 is arranged at a spacing from the flange 28 and from the first balancing region 30 that is dependent on the rotor type. The balancing regions 30, 31 are generally specified by the manufacturer of the shaft 1 and comprise a balancing plane in each case. The position of a balancing device 32 that is detected by the sensor and calculated by the control unit is shown as a bar. FIG. 5 is a more comprehensive view of the shaft 1, whereas FIG. 6 is a schematic simplified depiction of the shaft 1 comprising the balancing regions 30, 31, and the balancing device 32 shown as a bar. Since the display unit displays to the user the position of the balancing regions 30, 31 and the position of the balancing device 32, the user can decide which balancing region 30, 31 he wishes to begin with. This decision may be influenced, for example, by the position of the balancing device 32 since, for example, in FIG. 5 the balancing device 32 is closer to the balancing region 31, whereas in FIG. 6 the balancing device 32 is closer to the balancing region 30. Once the user has decided which balancing region he wishes to begin with, he moves the balancing device 32 into the selected balancing region 30, 31. Since a display unit is also arranged on the balancing device 32 or in the vicinity thereof, the current position of the balancing device 32 relative to the balancing regions 30, 31 and relative to the shaft 1 is also displayed on the display unit during movement of the balancing device 32. The user can thus Identify when the balancing device 32 is positioned in the selected balancing region 30, 31. Moreover, the balancing mass necessary for the compensation, and the corresponding counterweight for the approached and/or selected balancing region 30, 31, is displayed on the display unit. Furthermore, the shaft 1 can be automatically rotated into the relevant angular position when the balancing device 32 approaches the associated balancing region 30, 31.

The invention claimed is:

1. Method for attaching counterweights to a shaft, using at least one balancing device that is movable longitudinally to the shaft that is arranged in the at least one balancing device and that comprises a fastening device for fastening the counterweights to the shaft, the method comprising the steps of:

a. receiving the shaft in a bearing of the at least one balancing device, wherein the bearing is arranged on a machine bed, such that said shaft is rotatable about an axis of rotation;
 b. rotating the shaft about the axis of rotation, determining the imbalance of the shaft, and calculating, using an evaluation unit, balancing masses and angular positions for at least two balancing planes associated with a specified balancing region in each case;
 c. displaying a position of at least one balancing device relative to the balancing planes associated with the balancing regions on a display unit that is arranged on the at least one balancing device and that is connected, for data exchange, to a control unit, wherein a sensor that is fixed to the at least one balancing device detects a position data of said balancing device while the at least one balancing device is moved along the shaft and routes the position as position data to the control unit which determines the position of the at least one balancing device relative to the balancing regions;
 d. moving the at least one balancing device into one of the displayed balancing regions, and displaying, on the display unit, the balancing region approached by the at least one balancing device and the balancing mass associated with said region;
 e. fitting the fastening device with a counterweight corresponding to the displayed balancing mass; and
 f. fastening the counterweight to the shaft;
wherein steps d. to f. are repeated in further balancing regions or balancing planes in order to attach further counterweights, and selecting a sequence for attaching the counterweights.

2. Method according to claim 1, wherein the counterweight is fastened to the shaft only when the at least one balancing device is positioned within the balancing region specified by the evaluation unit.

3. Method according to claim 1, wherein the control unit determines the position of the at least one balancing device relative to the shaft received in the bearing, and the determined position is displayed on the display unit.

4. Method according to claim 1, wherein the sensor detects position data arranged on the machine bed.

5. Method according to claim 1, wherein fastening of the counterweight and movement of the at least one balancing device are initiated by switches on a controller arranged on a handle.

6. Method according to claim 1, wherein the shaft is rotated, in step d., into a calculated angular position for attaching the counterweight.

7. Method according to claim 1, wherein a movement direction is detected during movement of the at least one balancing device, and wherein the shaft is rotated, using the control unit, into an angular position that is determined for attaching a counterweight in the balancing region that is in the movement direction and is adjacent to the at least one balancing device.

* * * * *